United States Patent [19]

Carey et al.

[11] Patent Number: 5,694,532
[45] Date of Patent: Dec. 2, 1997

[54] METHOD FOR SELECTING A THREE-DIMENSIONAL OBJECT FROM A GRAPHICAL USER INTERFACE

[75] Inventors: Richard Carey, Los Altos; Christopher F. Marrin, Fremont; David C. Mott, Mountain View; Richard S. Pasetto, Sunnyvale, all of Calif.

[73] Assignee: Silicon Graphics, Inc., Mountain View, Calif.

[21] Appl. No.: 590,561

[22] Filed: Jan. 26, 1996

[51] Int. Cl.⁶ .................................................. G06T 17/40
[52] U.S. Cl. ........................................ 395/119; 395/339
[58] Field of Search ................................ 395/119, 127, 395/154, 326, 333-4, 339; 364/140, 146, 468.03, 468.04

[56] References Cited

U.S. PATENT DOCUMENTS

| | | | |
|---|---|---|---|
| 4,862,392 | 8/1989 | Steiner | 364/522 |
| 5,329,613 | 7/1994 | Brase et al. | 395/122 |
| 5,363,475 | 11/1994 | Baker et al. | 395/122 |
| 5,379,371 | 1/1995 | Usami et al. | 395/128 |
| 5,432,894 | 7/1995 | Funak | 395/119 |
| 5,471,569 | 11/1995 | Katoh | 395/134 |
| 5,539,427 | 7/1996 | Bricklin et al. | 345/118 |

OTHER PUBLICATIONS

Foley, James D., et al, "Computer Graphics: Principles and Practices", Addison–Wesley Publishing Co., 2nd ed. pp. 112–117, 237–259, and 334–345, 1990.

Primary Examiner—Phu K. Nguyen
Assistant Examiner—Rudolph Buchel
Attorney, Agent, or Firm—Sterne, Kessler, Goldstein & Fox P.L.L.C.

[57] ABSTRACT

A method for selecting a three-dimensional object in a three-dimensional environment improves a speed and efficiency of a lassoing technique. The method reduces the number of objects that have to be rendered into images in order to determine whether the object is included within an area selected by the lasso. The method selects objects intersected by the lasso using ray picking. These selected objects are not rendered into images. The method determines those objects whose bounding boxes do not intersect a bounding box of the area selected by the lasso. These objects are also not rendered into images. The method renders the remaining objects into images to determine which are included with the area selected by the lasso.

9 Claims, 12 Drawing Sheets

METHOD FOR SELECTING A THREE-DIMENSIONAL OBJECT FROM A GRAPHICAL USER INTERFACE

CROSS REFERENCE TO RELATED APPLICATIONS

This application is related to a commonly owned application, filed concurrently herewith, entitled "Collaborative Work Environment Supporting Three-Dimensional Objects and Multiple Remote Participants," having application Ser. No. 08/590,562 and Attorney Docket Number 1452.1810000, which is incorporated herein by reference.

BACKGROUND OF THE INVENTION

1. Field of the Invention

The present invention relates generally to three-dimensional computing. More specifically, the present invention relates to selecting three-dimensional objects from a graphical user interface.

2. Related Art

Presently, several conventional techniques exist that permit a user to select two-dimensional items in a work area of a graphical user interface. One such technique involves maneuvering a cursor controlled by an input device (e.g., a mouse) over a item to be selected. A button on the input device is depressed, or "clicked", to select the item. Multiple items may be selected by depressing another button (e.g., <Shift> on a keyboard while clicking on each of the multiple items with the input device.

Another conventional technique involves "dropping and dragging" a rectangle around one or more item in the work area. An input device is used to "drop" a first corner of the rectangle in one location of the work area and then "drag" a second corner, diagonally opposed to the first corner, in another location. Any items included within an interior area of the rectangle formed between the first and second corners are selected. The interior area of the rectangle is referred to as a selected area. An item is included within the selected area, and hence selected, if any portion, even a pixel, of the item is within the selected area.

Yet another conventional technique used to select one or more items in a two-dimensional environment is referred to as a lassoing technique. The lassoing technique involves drawing a "lasso" around items in the work area that are to be selected. As with the drop-and-drag technique discussed above, any items included in the interior area of the lasso (i.e., the selected area) are selected. The lassoing technique differs from the drop-and-drag technique in that the determination of the selected area, and hence, which items are selected, is much more complex.

The first two of the above discussed techniques have been extended from the two-dimensional environment to a three-dimensional environment. However, due to its complexity, the lassoing technique has not been extended to the three-dimensional environment. In particular, the selected area of the lasso is a two-dimensional area, while the items to be selected may be three-dimensional objects. Basically, in order to determine whether the objects are included in the selected area, a two-dimensional image of the three-dimensional object must be projected, or rendered, into a plane of the selected area. Then, an overlapped area between the selected area and the image of the object must be determined. Performing these steps for each object in a work space of the three-dimensional environment is too computationally intensive and time-consuming to be practical for many applications.

What is needed is a method for selecting items in a work space of a three-dimensional environment using a lassoing technique.

BRIEF SUMMARY OF THE INVENTION

The present invention is a method for selecting a three-dimensional object from a work space in a three-dimensional environment using a "lassoing" technique. The lassoing technique permits a user to draw a "lasso" around one or more items in the work space to select all items, including a three-dimensional object, that are included in a selected area formed by the lasso. This provides the user with more flexibility and convenience in selecting items than other methods of selection presently available in the three-dimensional environment.

A feature of the present invention that yields a practical lassoing technique is a reduction in the number of three-dimensional objects that have to be projected or rendered into a plane of the selected area. This is accomplished by performing relatively simple computations to either include or exclude various objects in the work space. Only the objects in the work space that have not previously included or excluded need to be rendered to determine whether they are included in the selected area.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Overview

The present invention is directed toward a method for selecting an object in a three-dimensional environment using a lassoing technique. The lassoing technique permits a user to draw a "lasso" around one or more items in a work space of the three-dimensional environment, including the object, to select the items. Items that are included in an interior area formed by the lasso are selected.

Example Environment

The present invention is now described in terms of an example environment. The present invention is described in terms of a three-dimensional environment such as a three-dimensional authoring or editing tool. These tools permit a user to generate or edit a three-dimensional model of an object. Another such environment is a collaborative work environment such as InPerson, which is available from Silicon Graphics, Inc., Mountain View, Calif. InPerson allows multiple remote participants to collaboratively view, manipulate, and mark-up three-dimensional models of objects. The collaborative work environment of InPerson is the focus of commonly owned application entitled "Collaborative Work Environment Supporting Three-Dimensional Objects and Multiple Remote Participants" having application Ser. No. 08/590,562 and Attorney Docket Number 1452.1810000, which is incorporated herein by reference as if reproduced in full below.

Figure 1:
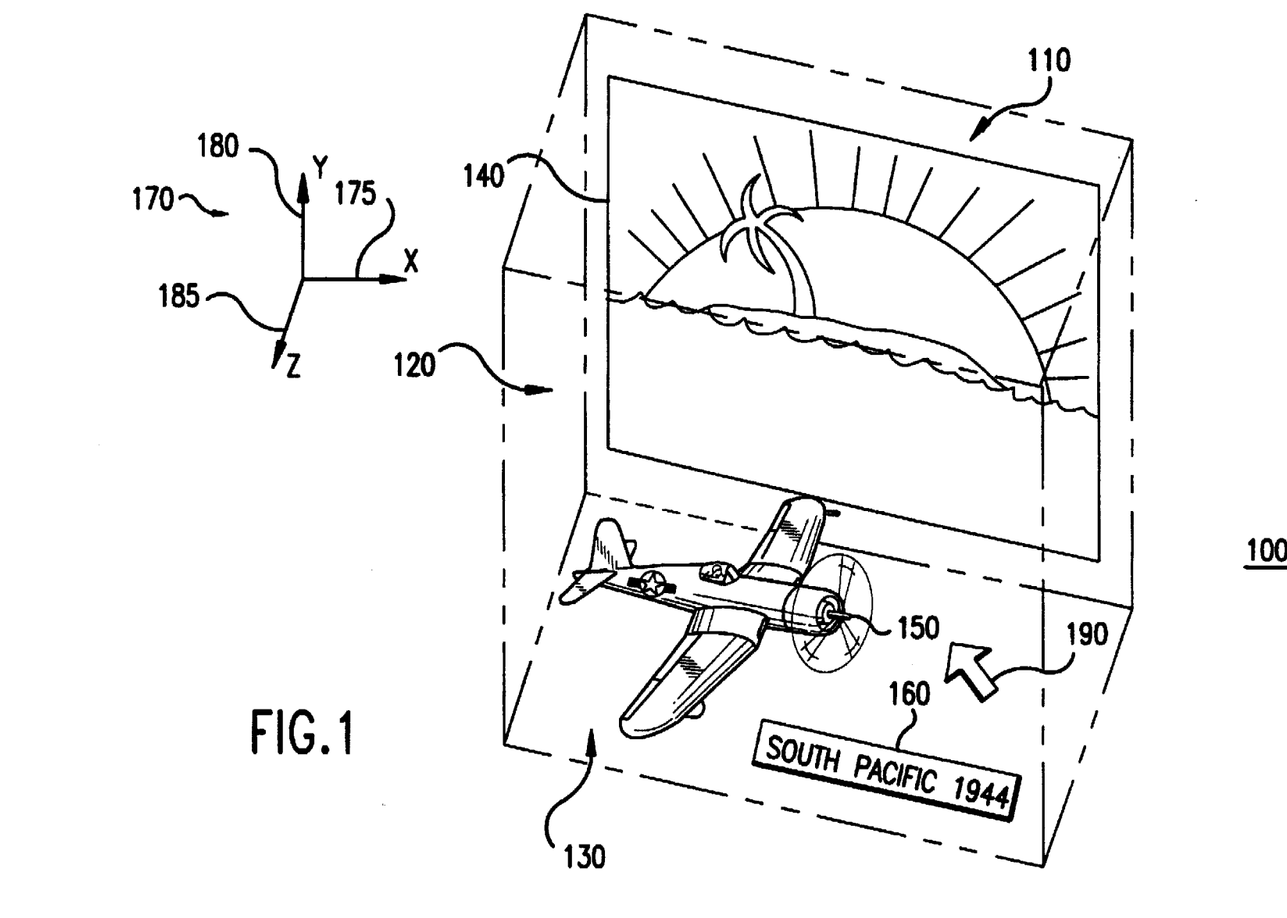
FIG. 1 is a diagram illustrating an example of a three-dimensional environment also referred to as a work space.

FIG. 1 is a diagram illustrating an example of a three-dimensional environment 100 also referred to as work space 100. Work space 100 is comprised of an image plane 110 (to be distinguished from an airplane shown as object 150), a three-dimensional object space 120, a text plane 130, and a coordinate frame 170. Image plane 110 includes one or more images, such as image 140. Object space 120 includes one or more objects, such as object 150. Text plane 130 includes one or more text or drawing entries 160 and a cursor 190. Cursor 190 is maneuvered via an input device (not shown) according to techniques well known in the art to perform various operations in work space 100.

Figure 2:
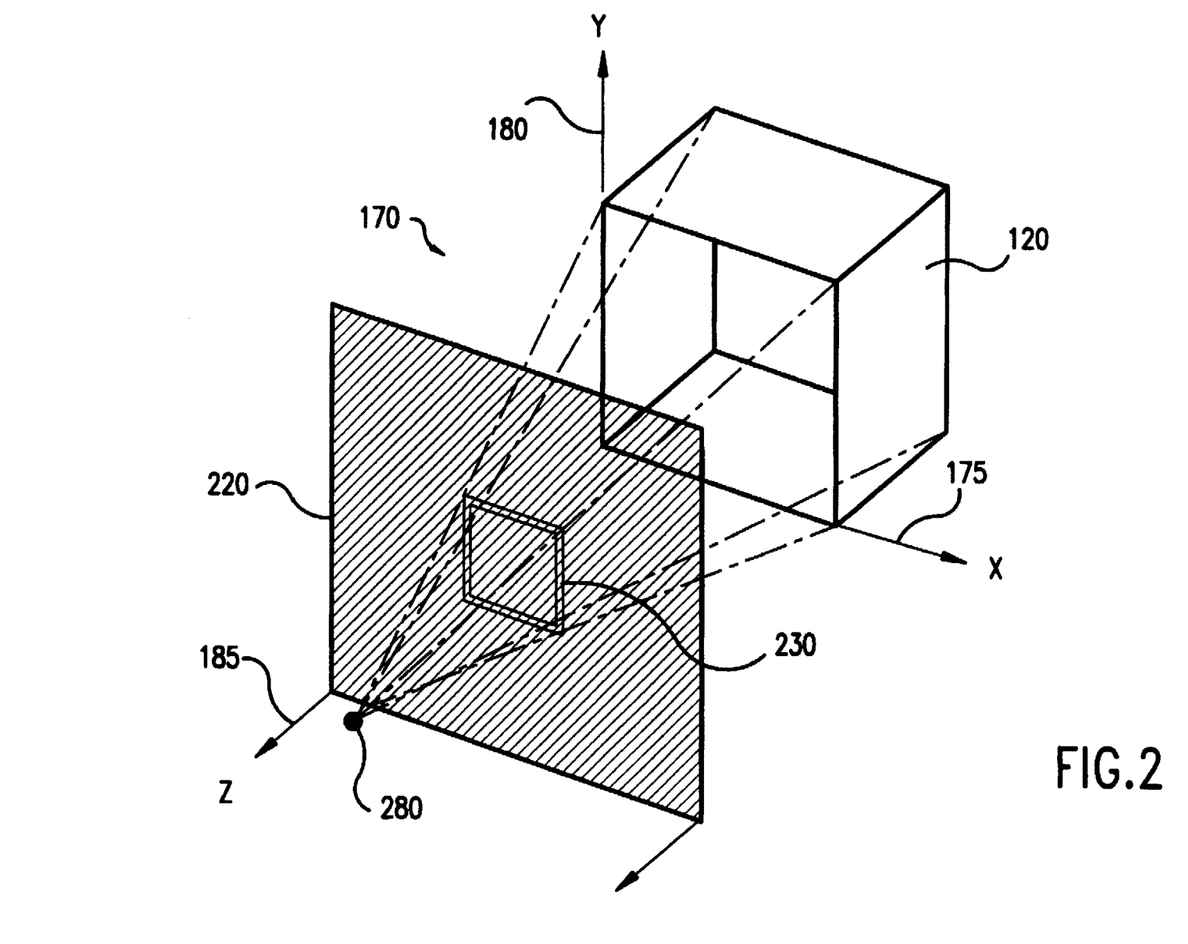
FIG. 2 is a diagram illustrating a relationship between an object space and an image of object space.

FIG. 2 is a diagram illustrating a relationship between three-dimensional object space 120 and an image 230 of object space 120. In the present invention, all objects 150 in object space 120 are described as three-dimensional models in coordinate frame 170. Image 230 is generated by projecting or rendering each of the models of objects 150 into a two-dimensional object plane 220. In the present invention, object plane 220 includes projections of each object 150 in object space 120 as viewed from a fixed perspective 280.

According to the present invention, an onscreen display of work space 100 is built in a particular order. The onscreen display is the depiction of work space 100 viewed by the user. First, image plane 110, including images 140, is laid into the onscreen display. Second, object space 120, including objects 150 are projected or rendered into object plane 220. Third, object plane 220 is laid into the onscreen display, overlaying image plane 110. Fourth, text plane 130, including entries 160 and cursor 190, is laid into the onscreen display, overlaying both image plane 110 and object plane 220.

The above process for building the onscreen display forms a hierarchy among various items displayed in work space 100. For example, two-dimensional images 140 remain in the background. Rendered images 230 of objects 150 appear in front of two-dimensional images 140 in the background. Drawing and text entries 160 and cursors 190 appear in front of both the two-dimensional images 140 in the background and the rendered images 230 of the objects 150.

In order to operate on (e.g., move, copy, cut-and-paste, delete, manipulate, etc.) any of the items (i.e., images 140, objects 150, or entries 160) in work space 100, the items must be selected by the user. The present invention permits the user to select the items in work space 100 using a "lassoing" technique.

Lassoing an Item

Figure 3:
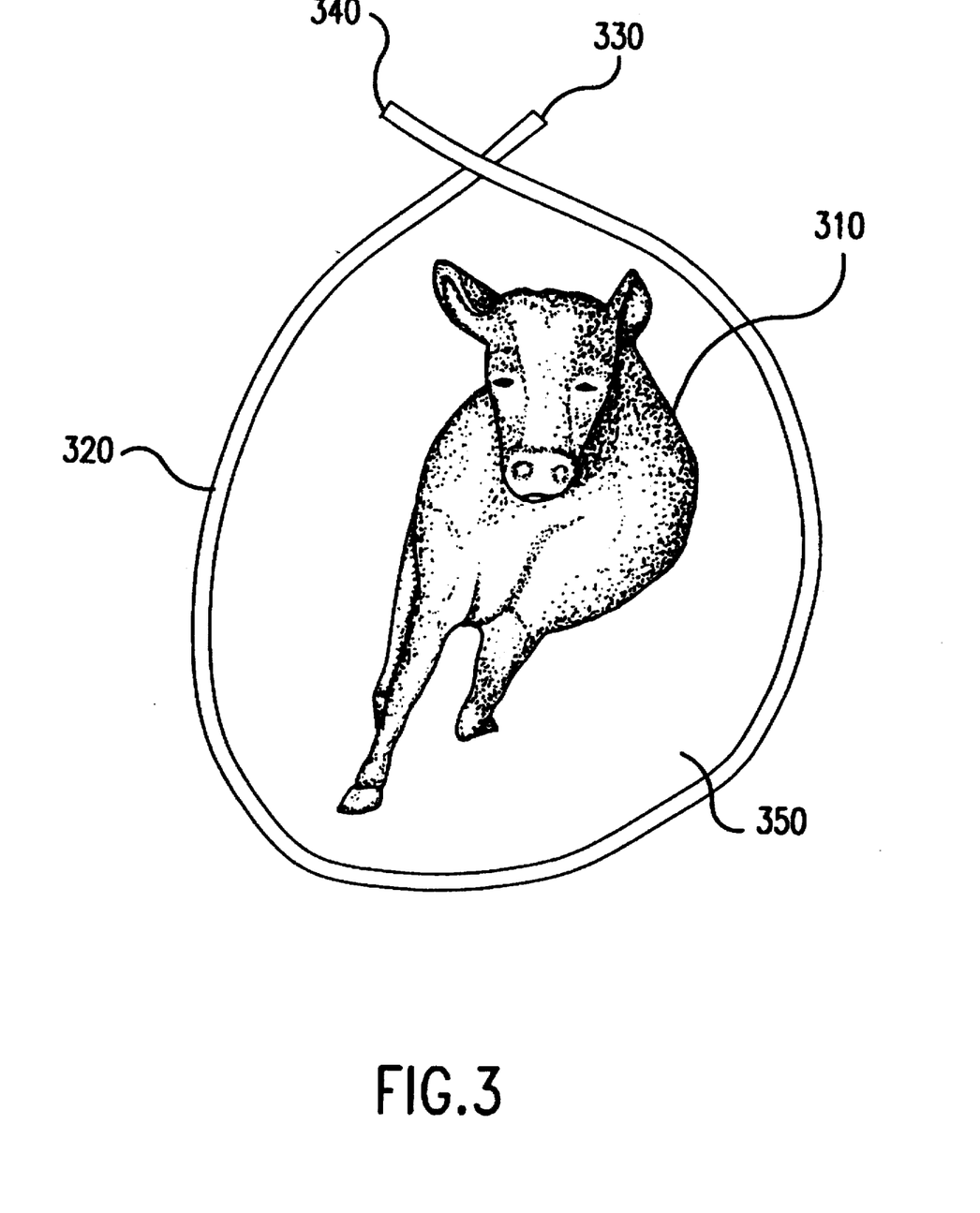
FIG. 3 is a diagram illustrating an object being selected by the lassoing technique as viewed by the user.
Figure 4:
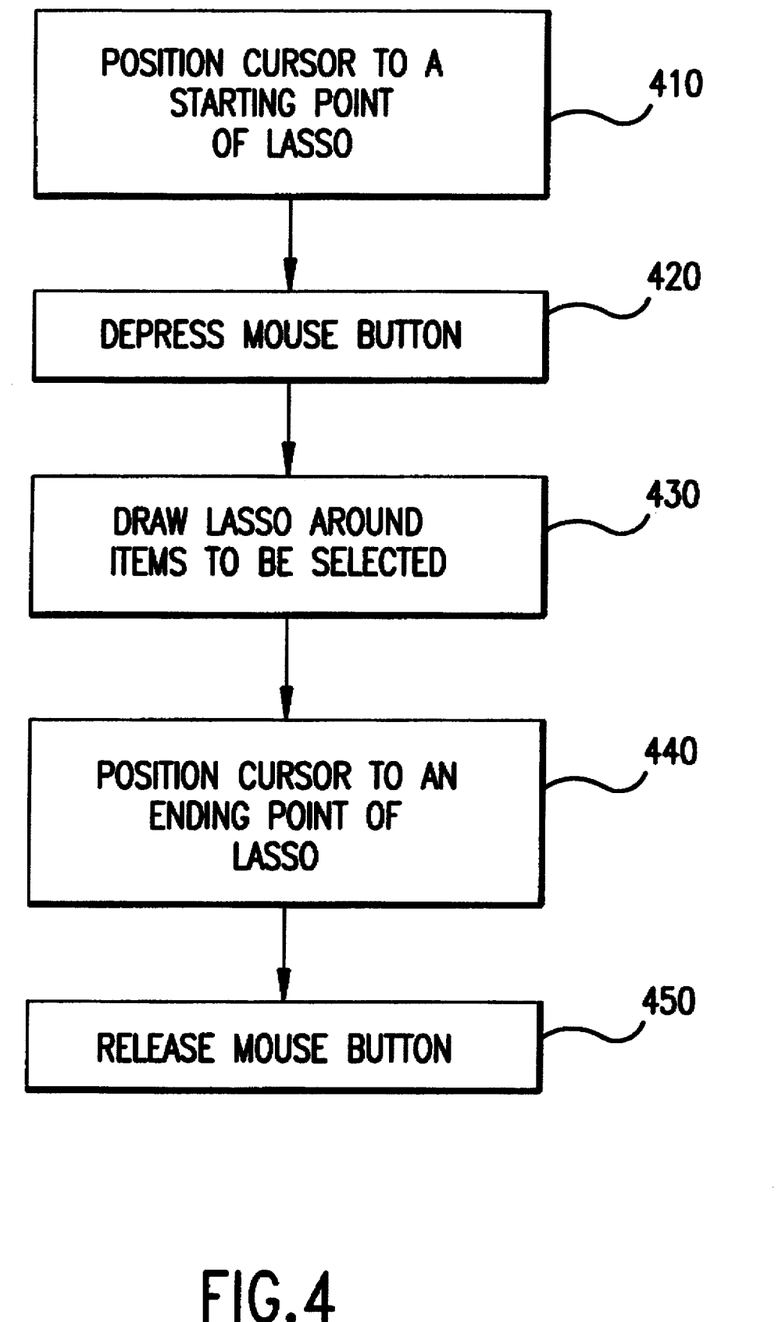
FIG. 4 is a diagram illustrating the steps performed by a user to lasso the object according to one embodiment of the present invention.

FIG. 3 is a diagram illustrating an object 310 being selected by the lassoing technique as viewed by the user. FIG. 4 is a diagram illustrating the steps performed by a user to lasso object 310 according to one embodiment of the present invention. The following discussion will refer to FIG. 3 and FIG. 4.

In a step 410, the user positions cursor 190 (shown in FIG. 1) to a starting point indicated by a first end 330 of a lasso 320. In a step 420, the user depresses a button on an input device, such as a mouse. In a step 430, the user, while depressing the mouse button, draws lasso 320 by maneuvering cursor 190 around object 310. In a step 440, the user positions cursor 190 at an ending point indicated by a second end 340 of lasso 320. In a step 450, the user completes lasso 320 by releasing the mouse button thereby selecting object 310.

As shown in FIG. 3, lasso 310 forms an area, referred to as selected area 350. Any object 310 included in selected area 350 is selected according to one embodiment of the present invention. Objects 310 are included in selected area 350 if any portion of object 310 is within selected area 350. In other words, the entire object 310 need not be within selected area 350. Object 310 is included in selected area 350 even if lasso 320 merely intersects object 310.

Figure 5A:
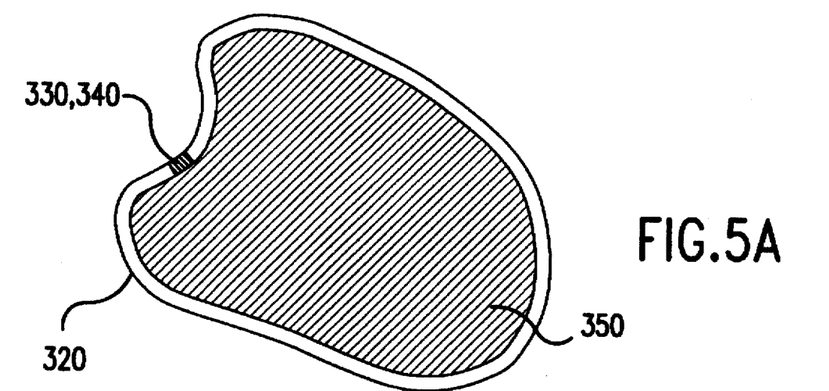
FIGS. 5A, 5B, 5C, and 5D are diagrams illustrating selected area for various lassos.

FIGS. 5A–D are diagrams illustrating selected area 350 for various configurations of lasso 320. In each of FIGS. 5A, 5B, 5C and 5D, selected area 350 is indicated by crosshatch. In FIG. 5A, first end 330 and second end 340 of lasso 320 are coincident. Selected area 350 is the area enclosed by lasso 320.

Figure 5B:
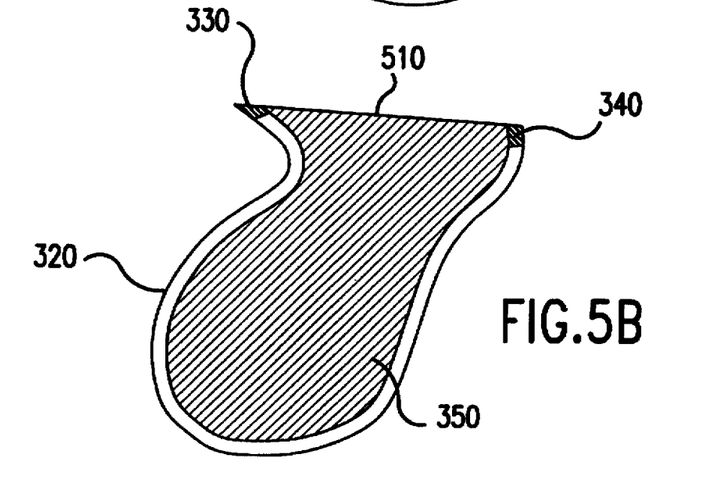

In FIG. 5B, first end 330 and second end 340 are not coincident. Thus, area is not actually enclosed by lasso 320. However, one embodiment of the present invention determines a line 510 between first end 330 and second end 340 to effectively enclose selected area 350.

Figure 5C:
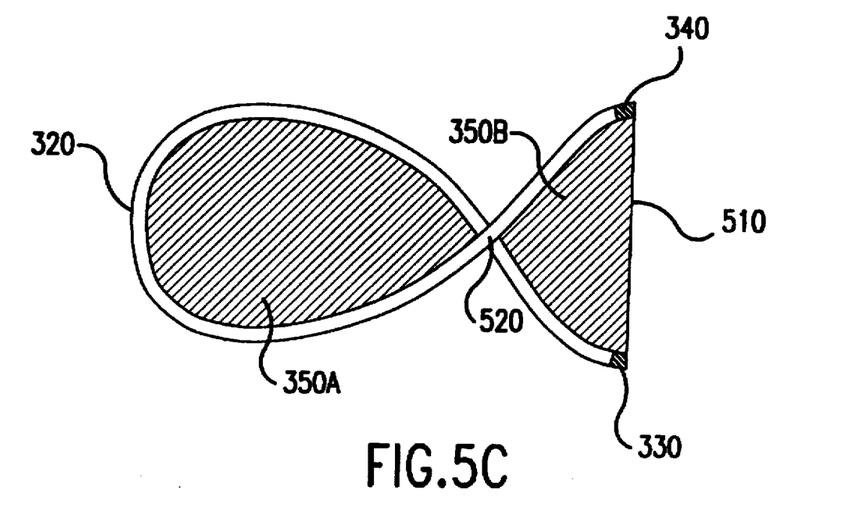

In FIG. 5C, first end 330 and second end 340 are also not coincident. Furthermore, lasso 320 has crossed over itself at a point 520. In this case, one embodiment of the present invention again determines line 510 and encloses both areas 350A and 350B as selected area 350.

Figure 5D:
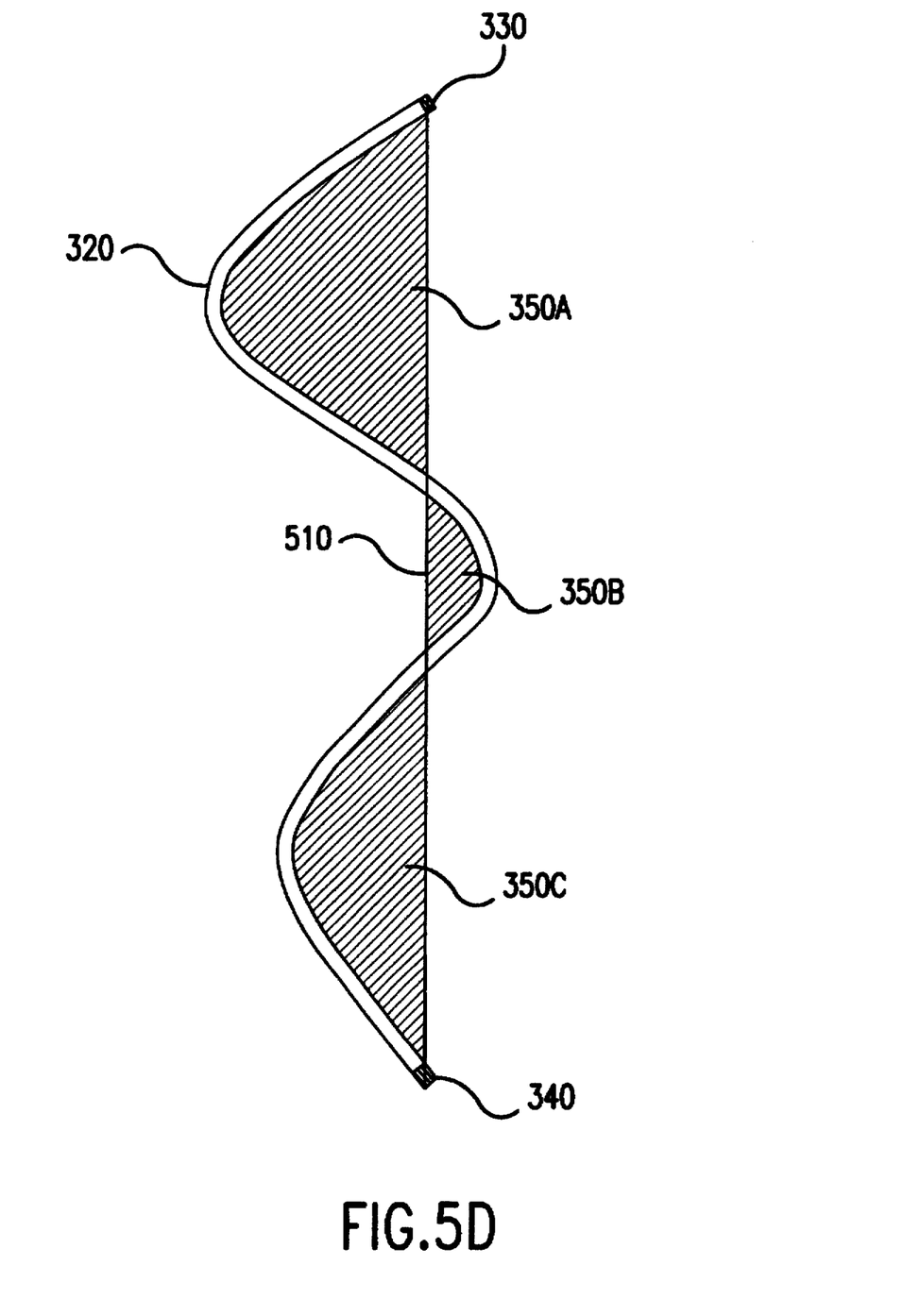

In FIG. 5D, first end 330 and second end 340 are also not coincident. Furthermore, lasso 320 does not appear to enclose an area. In this case, one embodiment of the present invention again determines line 510 and encloses three areas 350A, 350B and 350C as selected area 350.

Figure 6:
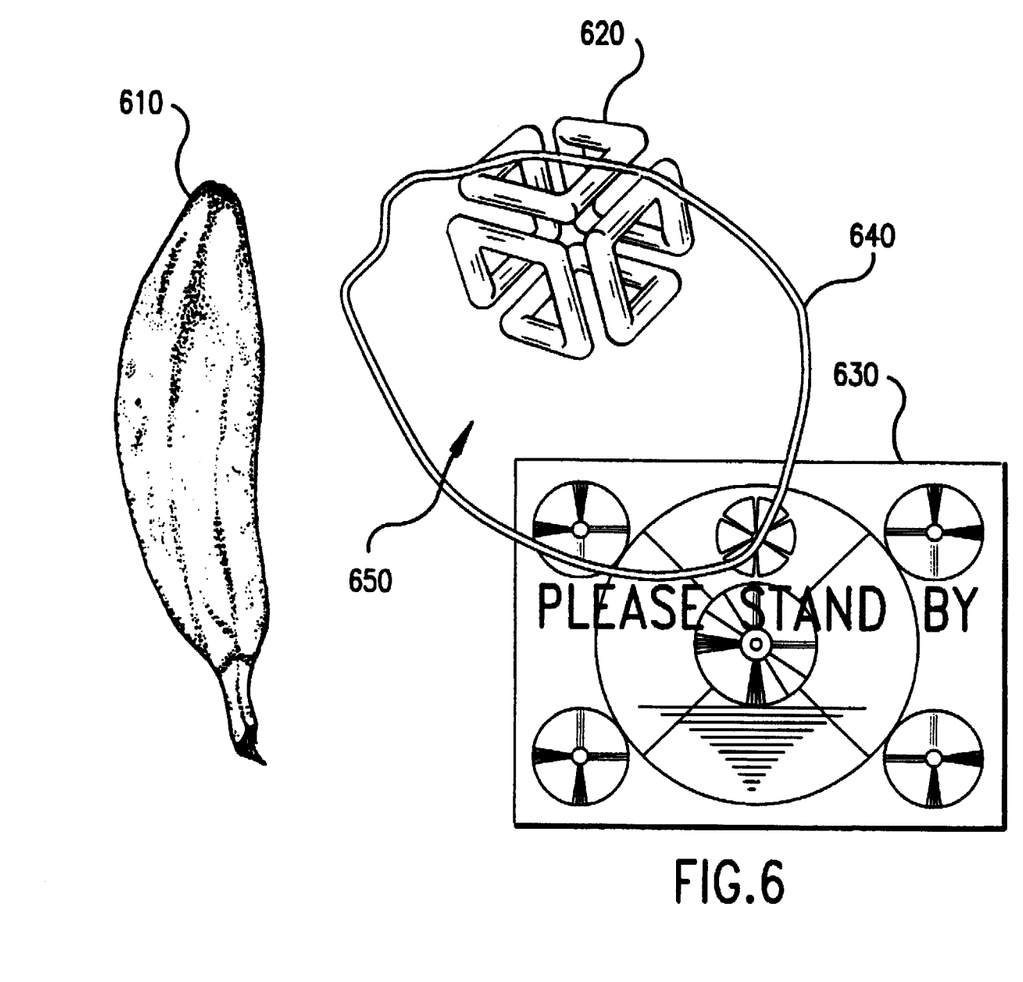
FIG. 6 is a diagram illustrating how several items in the work space are selected.
Figure 7:
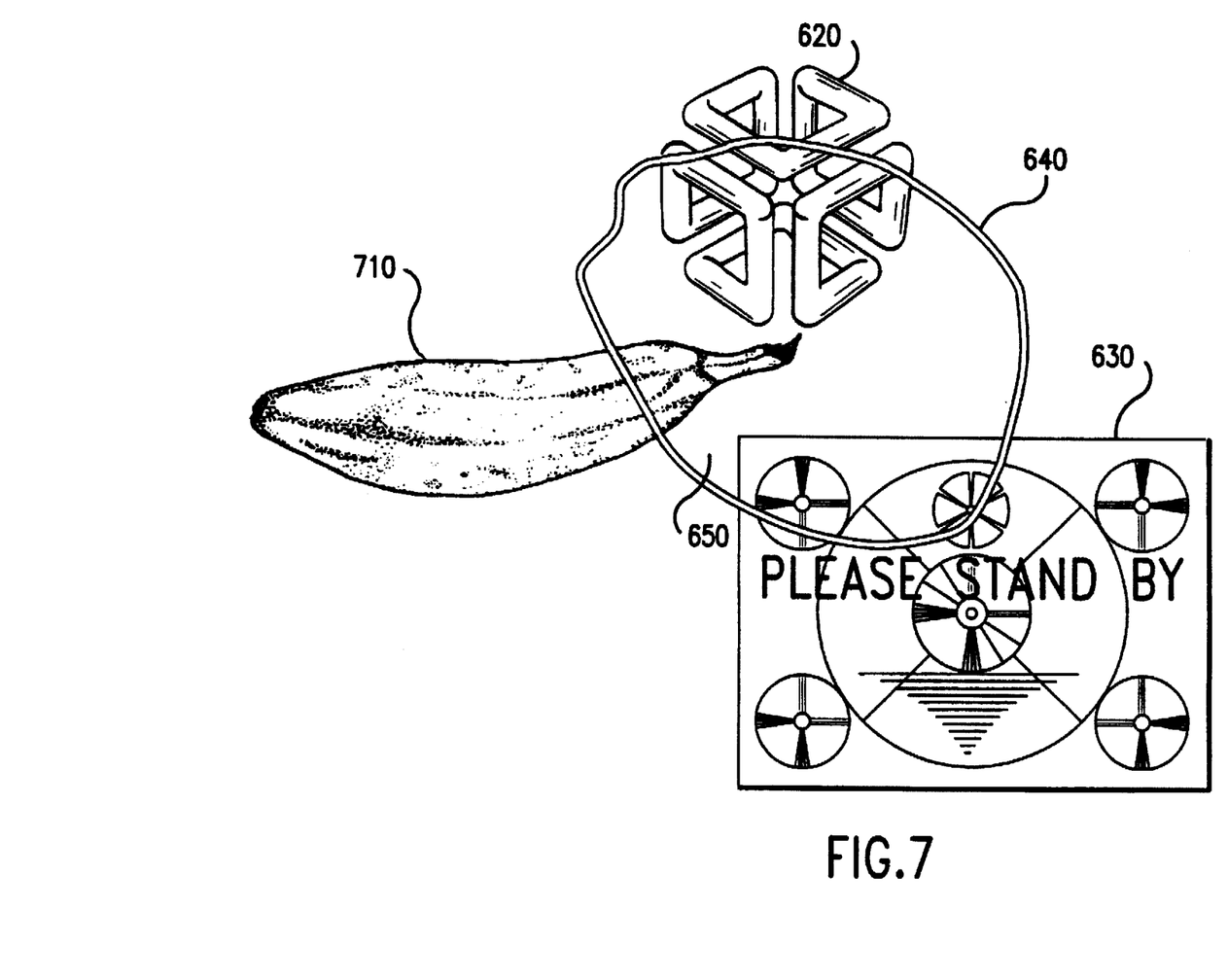
FIG. 7 is another diagram illustrating how several items in the work space are selected.

FIG. 6 and FIG. 7 are diagrams illustrating, conceptually, which items are selected using the lassoing technique of the present invention. FIG. 6 illustrates a three-dimensional banana 610, a three-dimensional trademark 620 of Silicon Graphics, Inc., a two-dimensional sign 630, and a lasso 630. As shown in FIG. 6, trademark 620 and sign 630 are included in a selected area 650 and are thereby selected according to the present invention. Banana 610, however, is neither included within or intersected by lasso 640. Accordingly, banana 610 is not selected.

FIG. 7 illustrates a rotated banana 710, trademark 620, sign 630, and lasso 640. As shown in FIG. 7, trademark 620, sign 630 and rotated banana 710 are included in selected area 650 and are thereby selected according to the present invention.

Determining Which Objects are Selected by the Lasso

Figure 8:
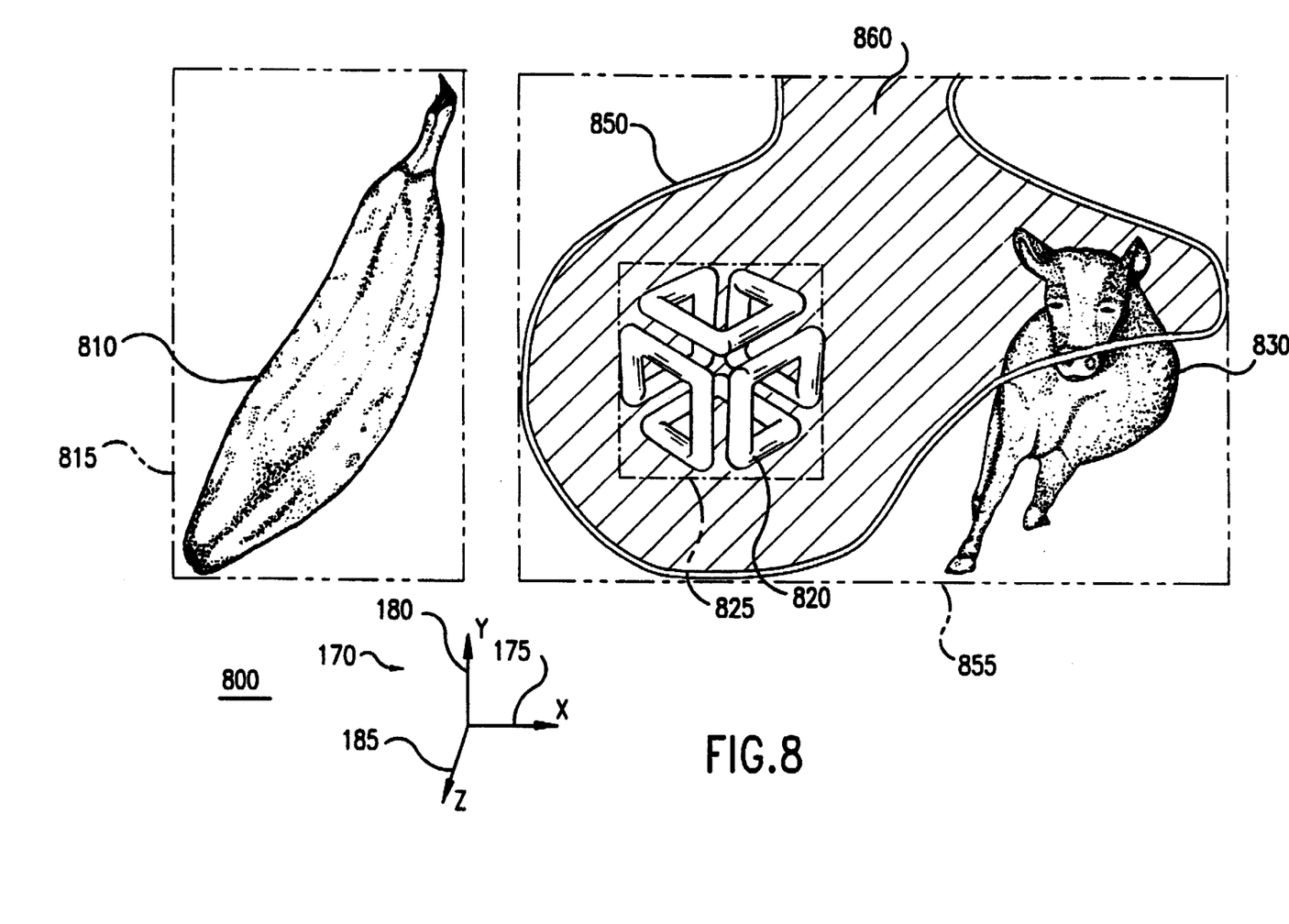
FIG. 8 is a diagram used to describe how the present invention determines which objects are selected by a lasso.
Figure 9:
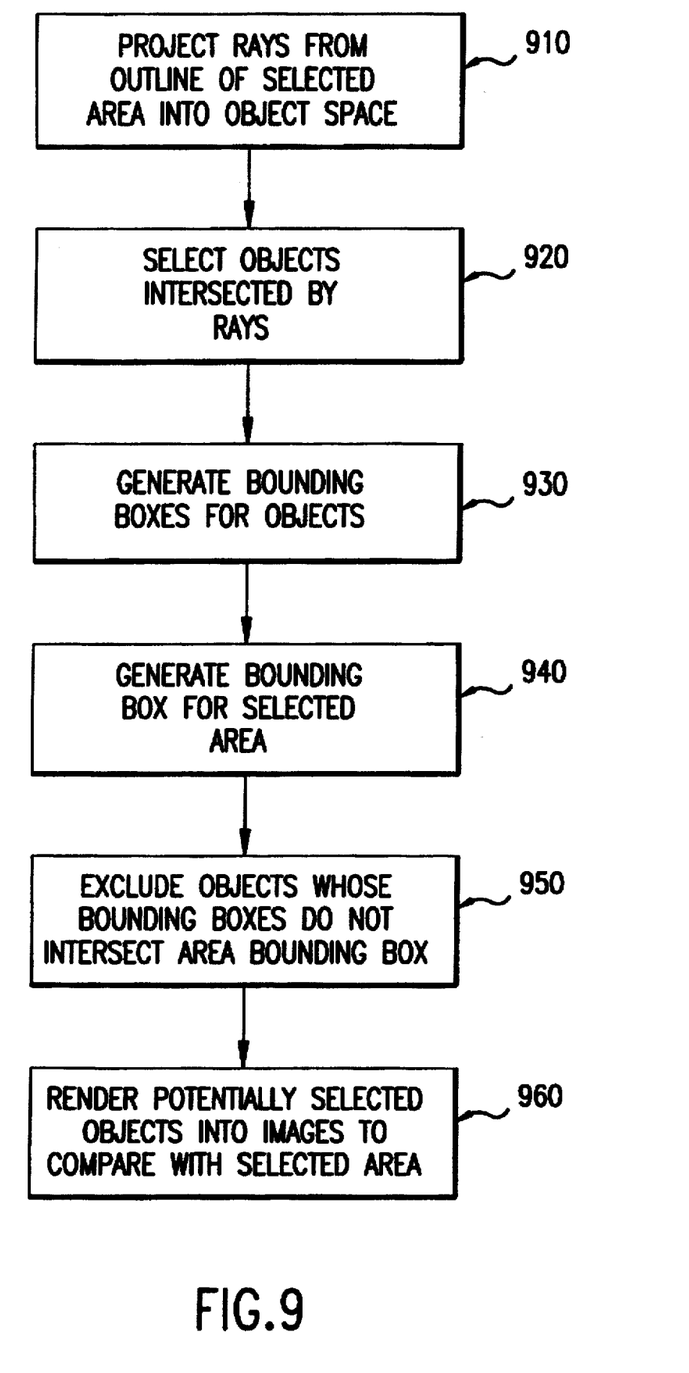
FIG. 9 is a diagram illustrating the steps performed by the present invention to determine which objects are included in area selected by the lasso.

FIG. 8 is a diagram illustrating a work space 800 having several items including a banana 810, a trademark 820, and a calf 830. Banana 810, trademark 820 and calf 830 are each objects in an object space (not shown) of work space 800. FIG. 8 is used to describe how the present invention determines which objects are selected by a lasso 850. FIG. 9 is a diagram illustrating the steps performed by the present invention to determine which items are included in a selected area 860 of lasso 850. As discussed above, the present invention implements an efficient process to reduce the number of objects that have to be rendered into an offscreen plane to determine which objects are included in selected area 860.

In a step 910, rays are cast or projected from an outline of lasso 850 parallel to z-axis 185 through the object space to determine whether any of the objects are intersected by lasso 850. This step, referred to as ray picking, is a relatively simple and efficient operation that is well known in the art. In a step 920, those objects intersected by the projected rays are indicated as selected objects. Thus, as shown in FIG. 8, calf 830 is indicated as a selected object while banana 810 and SGI trademark 820 remain unselected objects after step 920. In a preferred embodiment of the present invention, step 910 and step 920 are performed while lasso 850 is being drawn by the user.

In a step 930, a bounding box is generated for lasso 850 and objects in work space 800. A bounding box is a polygon that is used to quickly determine if one area clearly does not overlap another area. In a preferred embodiment of the present invention, the bounding box is a rectangle defined using the maximum and minimum x- and y- coordinates of the three-dimensional model of the object. Specifically, the bounding box in the preferred embodiment is the rectangle defined with the following coordinates of each object: $(x_{min}, y_{min})$, $(x_{min}, y_{max})$, $(x_{max}, y_{max})$ and $(x_{max}, y_{min})$.

In one embodiment, an object bounding box is generated for each object in work space 800. In an alternate embodiment, object bounding boxes are generated only for those objects not selected above in step 920 by ray picking. FIG. 8 illustrates the latter embodiment. Thus, in step 930, an object bounding box 815 is generated for banana 810, and an object bounding box 825 is generated for trademark 820. In a step 940, an area bounding box 855 is generated for lasso 850.

In a step 950, those objects having an object bounding box that does not intersect area bounding box 855 are excluded from further consideration. The remaining objects (i.e., those whose bounding boxes do intersect with area bounding box 855) are indicated as potentially selected objects. In the preferred embodiment shown in FIG. 8, determining whether bounding boxes 815, 825, and 835 intersect with area bounding box 855 involves simple comparisons between the respective coordinates of the bounding boxes. As a result of step 950 and as shown in FIG. 8, trademark 820 is indicated as a potentially selected object while banana 810 is excluded from further consideration.

Figure 10:
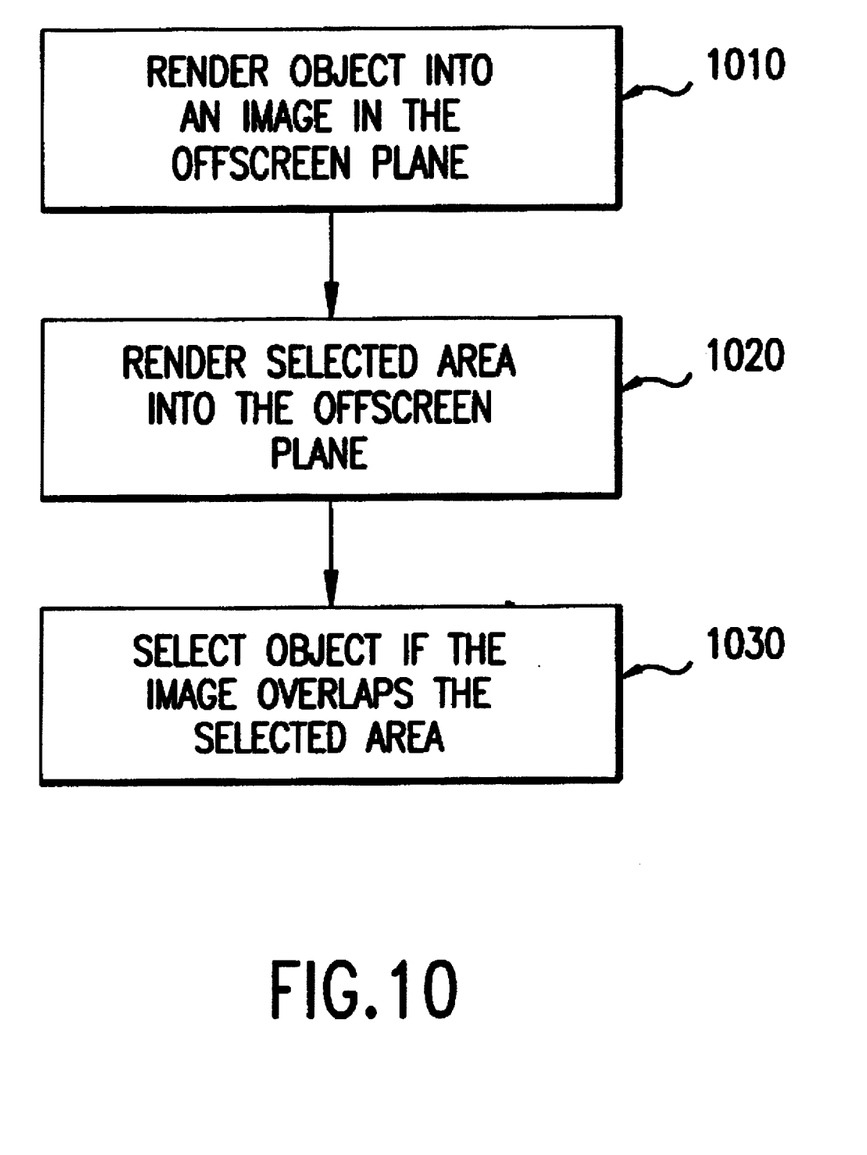
FIG. 10 is a diagram illustrating the steps performed by step 960 according to a first embodiment of the present invention.
Figure 11:
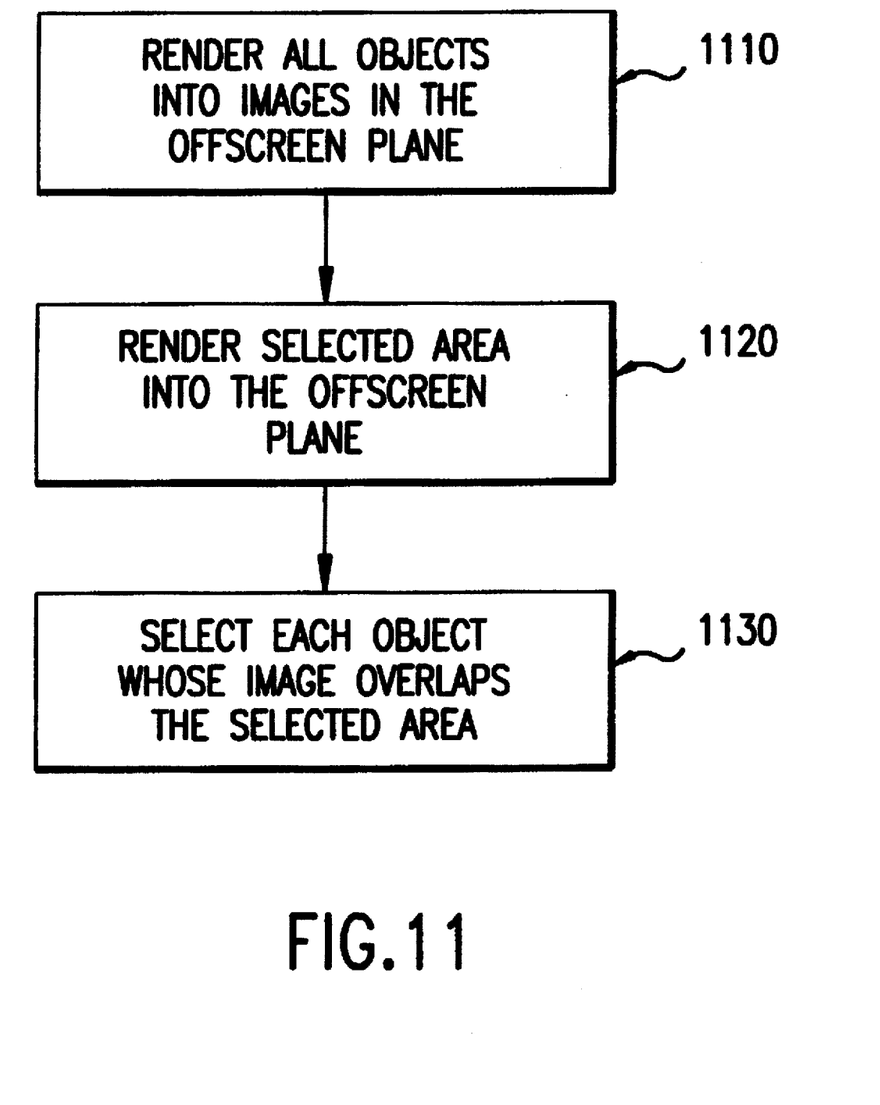
FIG. 11 is a diagram illustrating the steps performed by step 960 according to a second embodiment of the present invention.

In a step 960, the potentially selected objects (i.e., those not already included as selected objects or excluded from further consideration) are rendered into images and compared with selected area 860 in an offscreen plane (not shown) to determine which of the potentially selected objects are included in selected area 860. The offscreen plane is defined as a computational plane or buffer not viewable by the user. Two embodiments of step 960 of the present invention are discussed. FIG. 10 is a diagram illustrating the steps performed by step 960 according to a first embodiment of the present invention. FIG. 11 is a diagram illustrating the steps performed by step 960 according to a second embodiment of the present invention.

The first embodiment is now discussed with respect to FIG. 10. In a step 1010, one of the potentially selected objects in object space 800 is projected or rendered into an image in the offscreen plane. In a step 1020, selected area 860 is rendered into the offscreen plane. In a step 1030, the object is selected if the image overlaps selected area 860 in the offscreen plane. Step 1010, step 1020, and step 1030 are repeated for each of the potentially selected objects in the object space.

In a preferred implementation of the first embodiment, each pixel in the image is tagged with a first identifier. Likewise, each pixel in the selected area is tagged with a second identifier. Then, in this preferred embodiment, the offscreen plane is scanned to determine if any pixels have been tagged with both the first identifier and the second identifier. If so, the image overlaps selected area 860.

The second embodiment is now discussed with respect to FIG. 11. In a step 1110, all of the potentially selected objects in the object space are collectively rendered into the offscreen plane. In a step 1120, selected area 860 is rendered into the offscreen plane. In a step 1130, each of the potentially selected object whose images overlap the selected area 860 are selected.

In a preferred implementation of the second embodiment, each pixel in an image of an object is tagged with an first identifier corresponding to the object. Thus, each pixel can be identified as belonging to a particular object by the first identifier. Each pixel in selected area 860 is tagged with a second identifier. Then, the offscreen plane is scanned to determine if a pixel has been tagged with both the first identifier and the second identifier. In this second embodiment, the object identified by the first identifier is selected.

In a preferred implementation of either of first and second embodiment, the identifier is a color assigned to the pixel. Thus, for example, rendered trademark 820 is tagged with the color red in offscreen plane while calf 830 is tagged with the color blue. Other identifiers are available as would be apparent to one skilled in the art.

The difference between the first embodiment and the second embodiment of the present invention will now be discussed. Because the first embodiment renders each of the potentially selected objects independently with the selected area, the first embodiment will select a background object that is completely obscured by a foreground object (assuming that both objects are included in selected area 860). This occurs because the background object is rendered with the selected area without the foreground object obscuring it.

In contrast, the second embodiment will not select the background object obscured by the foreground object. This occurs because the background object remains obscured by the foreground object when the objects are rendered together. Thus a pixel in the offscreen plane will never be assigned the first identifier corresponding to the background object.

In a preferred embodiment of the present invention, the offscreen plane has a lower resolution (in terms of numbers of pixels) than the onscreen display viewed by the user. The lower resolution means that fewer pixels have to be scanned. This further speeds the processing required to determine whether the potentially selected objects are within selected area 860.

Although the invention has been described in detail in terms of specific embodiments, various modifications can be made without departing from the scope of the invention.

We claim:

1. A method for selecting one or more items displayed in a three-dimensional environment, the method comprising:
   (a) selecting an area in the three-dimensional environment;
   (b) indicating, as a selected item, each of the items that is intersected by rays projected from a perimeter of said selected area in a direction parallel to a z-axis of the three-dimensional environment;
   (c) indicating, as a potentially selected item, each of the items in the three-dimensional environment that has a bounding box that overlaps a bounding box of said selected area;
   (d) projecting each of said potentially selected items not indicated as said selected item into an offscreen plane;
   (e) projecting said selected area into said offscreen plane; and
   (f) indicating, as a selected item, each of said projected items that overlaps said projected area in said offscreen plane.

2. The method of claim 1, wherein said offscreen plane is comprised of a plurality of pixels, and further comprising, before said step (f) of indicating, the steps of:
   (g) tagging each of said plurality of pixels in said offscreen plane that is included in each of said projected items with a first identifier identifying the item;
   (h) tagging each of said plurality of pixels in said offscreen plane that is included in said projected area with a second identifier; and
   (i) determining whether any of said plurality of pixels in said offscreen plane are tagged with both said first identifier and said second identifier thereby determining which of said projected items overlap said projected area.

3. The method of claim 2, wherein said selected area is formed by drawing a lasso that includes one or more of the items in the three-dimensional environment.

4. A method for selecting one or more items displayed in a three-dimensional environment, the method comprising:
   (a) drawing a lasso in the three-dimensional environment;
   (b) projecting rays from an outline of said lasso parallel to a z-axis of the three-dimensional environment;
   (c) indicating, as a selected item, each of the items that are intersected by said rays; and
   (d) projecting each of the items in the three-dimensional environment not indicated as said selected item into a plane of said lasso to determine whether any of the items are selected by an area enclosed by said lasso.

5. The method of claim 4, wherein said step (d) of projecting comprises the steps of:
   (1) projecting said area enclosed by said lasso into an offscreen plane;
   (2) projecting each of the items in the three-dimensional environment not indicated as said selected item into said offscreen plane; and
   (3) determining which of said projected items overlap said area enclosed by said lasso in said offscreen plane.

6. The method of claim 5, wherein said offscreen plane is comprised of a plurality of pixels, and further comprising, before said step (3) of determining, the steps of:
   (4) tagging each of said plurality of pixels in said offscreen plane that is included in said projected items with a first identifier identifying the item;
   (5) tagging each of said plurality of pixels in said offscreen plane that is included in said projected area enclosed by said lasso with a second identifier; and
   (6) determining whether any of said plurality of pixels in said offscreen plane are tagged with both said first identifier and said second identifier thereby determining which of the items overlap said area enclosed by said lasso.

7. The method of claim 5, further comprising, before said step (d) of projecting, the step of:
   (e) indicating, as a potentially selected item, each of the items in the three-dimensional environment not indicated as said selected item that has a bounding box that overlaps a bounding box of said area enclosed by said lasso.

8. A method for selecting one or more items displayed in a three-dimensional environment, the method comprising:
   (a) drawing a lasso in the three-dimensional environment;
   (b) determining a first set of selected items in the three-dimensional environment that is selected by said lasso, including the steps of:
      (1) projecting rays from an outline of said lasso into the three-dimensional environment in a direction parallel to a z-axis of the three-dimensional environment, and
      (2) including, in said first set of selected items, each of the items that is intersected by said rays;
   (c) determining a second set of selected items in the three-dimensional environment that is selected by said lasso, including the steps of:
      (1) indicating, as a potentially selected item, each of the items in the three-dimensional environment not included in said first set that has a bounding box that overlaps a bounding box of said lasso,
      (2) projecting each of said potentially selected items into an offscreen plane,
      (3) projecting an area of said lasso into said offscreen plane, and
      (4) including, in said second set of selected items, each of said projected items that overlaps said projected area in said offscreen plane; and
   (d) indicating, as a item selected by said lasso, each of said items in said first and second set of selected items.

9. The method of claim 8, wherein said offscreen plane is comprised of a plurality of pixels, and further comprising, before said step (c)(4) of including, the steps of:
   (i) tagging each of said plurality of pixels in said offscreen plane that is included in each of said projected items with a first identifier identifying the item;
   (ii) tagging each of said plurality of pixels in said offscreen plane that is included in said projected area with a second identifier; and
   (iii) determining whether any of said plurality of pixels in said offscreen plane are tagged with both said first identifier and said second identifier thereby determining which of said projected items overlap said projected area.

* * * * *